United States Patent [19]
Gensini et al.

[11] Patent Number: 5,802,097
[45] Date of Patent: Sep. 1, 1998

[54] MELTING METHOD FOR AN ELECTRIC ARC FURNACE WITH ALTERNATIVE SOURCES OF ENERGY AND RELATIVE ELECTRIC ARC FURNACE WITH SPECIAL BURNER POSITIONING

[75] Inventors: Gianni Gensini, Buia; Matteo Losciale, Udine; Corrado De Cecco, Ragogna, all of Italy

[73] Assignee: Danieli & C. Officine Meccaniche spA, Buttrio, Italy

[21] Appl. No.: 583,727

[22] Filed: Jan. 17, 1996

[30] Foreign Application Priority Data

Jan. 17, 1995 [IT] Italy ................. UD95A0003

[51] Int. Cl.$^6$ ................................. F27D 1/00
[52] U.S. Cl. ................ 373/72; 373/2; 373/22; 373/18; 373/85; 75/10.19; 266/47
[58] Field of Search .................. 373/2, 9, 71, 72, 373/85, 88, 116, 77, 22, 18, 21; 75/530, 10.19; 266/47, 265, 225, 226, 268; 219/121.36, 121.37

[56] References Cited

U.S. PATENT DOCUMENTS

| | | | |
|---|---|---|---|
| 3,459,867 | 8/1969 | Estes | 373/2 |
| 3,980,802 | 9/1976 | Paton et al. | 373/18 |
| 5,329,545 | 7/1994 | Dudill et al. | 373/72 |
| 5,444,733 | 8/1995 | Coassin et al. | 373/72 |

FOREIGN PATENT DOCUMENTS

| | | |
|---|---|---|
| 257450 | 3/1988 | European Pat. Off. . |
| 625685 | 11/1994 | European Pat. Off. . |
| 637634 | 2/1995 | European Pat. Off. . |
| 671595 | 9/1995 | European Pat. Off. . |
| 2162614 | 7/1973 | France . |
| 2208988 | 6/1974 | France . |
| 3806977 | 9/1989 | Germany . |

*Primary Examiner*—Tu B. Hoang
*Attorney, Agent, or Firm*—Antonelli, Terry, Stout & Kraus, LLP

[57] ABSTRACT

Melting method for an electric arc furnace with alternative sources of energy for the melting of iron-based alloys, the electric furnace (10) including tuyeres (13) positioned on the bottom to deliver oxygen, at least one tuyere (15) to deliver coal dust which works in the area of contact between the bath of molten metal (16) and the layer of slag (22), at least one supersonic lance (12) cooperating with a lance (29) to deliver coal dust, these lances (12, 29) having a working position (12c, 29c) in which the supersonic lance (12) is positioned in close proximity to the surface of the molten metal (16) and the lance (29) to deliver coal dust is positioned in the vicinity of the surface of the layer of slag (22), and a plurality of burners (28) positioned on the cooled sidewalls (31) of the furnace (10) and delivering oxygen-based gases and combustible substances, whereby at least two first burners (28) work with the action of one burner supporting the action of the next one, the furnace (10) being charged with one or more charges which provide for a first step of start-up of the melting and a second step of melting, a refining step and a tapping step being included, in which method in the first step of start-up of the melting at least one second burner (28e) collaborates in freeing quickly the path of introduction of the supersonic lance (12) and of the lance (29) to deliver coal dust.

21 Claims, 6 Drawing Sheets

MELTING METHOD FOR AN ELECTRIC ARC FURNACE WITH ALTERNATIVE SOURCES OF ENERGY AND RELATIVE ELECTRIC ARC FURNACE WITH SPECIAL BURNER POSITIONING

BACKGROUND OF THE INVENTION

This invention concerns a melting method for an electric arc furnace with alternative sources of energy and the relative electric arc furnace.

This invention is applied to the field of electric arc furnaces for the melting of iron-based alloys and has been conceived and designed to optimize the efficiency and output of a plant by using alternative sources of energy.

This invention aims to achieve a saving of electrical energy during the melting cycle and to reduce the cycle times by increasing the number of castings which can be achieved per day; moreover, the invention tends to increase the yield factor of the alternative energy introduced.

The invention is applied both to furnaces working with direct current and to furnaces working with alternating current.

The furnaces to which the invention is applied can have a tapping channel or a tap hole without any constraint regarding the positioning of the hole.

A typical and preferred, but not exclusive, application of the invention is its use in furnaces which are caused to work with the "pond" method, that is to say, with a liquid heel always present.

This means that, when the molten metal is withdrawn from the furnace, that molten metal is not completely withdrawn.

The invention is also suitable for the melting of completely cold charges.

The invention is applied both to furnace charges of scrap in skips or continuous charges of scrap or to continuous charges of pre-reduced material or to mixed charges.

The state of the art of methods for melting metals contains the procedure of injecting into the furnace gaseous elements based on oxygen, possibly in combination with carbonaceous fuels, to obtain a reaction of oxidation with those fuels and with the oxidizable chemical elements included in the molten metallic mass and in the scrap.

This reaction of oxidation theoretically makes possible the recovery of the intrinsic energy potential of the carbon and of the chemical elements in the molten metal and in the scrap by means of an exothermic oxidation reaction.

These gaseous elements with an oxygen base which are injected may consist of air, air enriched with oxygen or even of pure oxygen.

These gaseous elements can be blown onto the molten metal by means of lances located above the surface of the bath and/or by means of nozzles or tuyeres positioned in the hearth of the furnace.

U.S. Pat. No. 3,459,867 teaches the use of burners which deliver oxygen in a stoichiometric dose and therefore with a desired excess of oxygen.

These burners act along a circumference positioned between the electrodes and the sidewall of the furnace, and their method of working is with the action of one burner working as a support for the action of the next one so as to create a vortex in the empty part of the furnace.

GB-A-2,115,011 teaches the blowing of the stirring and conversion gas from below the bath of molten metal.

It also teaches the introduction from above of solid carbonaceous materials and the use of tuyeres positioned on the sidewall and delivering mixtures of gas towards the bath.

GB-A-1,421,203 teaches the delivery of oxygen or other gases from the bottom into a zone between the electrodes and the sidewall of the furnace.

FR-B-2.208.988 teaches the delivery of gas into the furnace from above downwards and also teaches the delivery of gas from below the scrap and/or bath of molten metal both in the zone of the electrodes and between the electrodes and the sidewall of the furnace.

This document includes, next, in the sidewall one or more lances which deliver oxygen and/or other gases, in a configuration such that the action of one lance acts as a support for the action of the next one, between the electrodes and the sidewall of the furnace, the purpose being to create a great mixing of the gases in the empty part of the furnace.

EP-B1-257.450 discloses a method whereby a plurality of lances are used which deliver oxygen or mixtures of oxygen between the electrodes and the inner sidewalls of the furnace, and whereby a plurality of nozzles are used which are arranged below the molten bath and in the zones where the lances work.

These nozzles positioned on the bottom are employed also to stir the bath and to make uniform the blowing action of the lances inasmuch as, even when lances of a supersonic type are used, the jet of the combustion gases cannot reach a depth greater than 20 to 30 cms. in the molten bath unless expendable lances are used.

The nozzles and tuyeres of the state of the art function typically with pressures up to 60 bar, but normally between 5 and 20 bar.

This high pressure has the effect that the exothermic reaction takes place generally in the empty part of the furnace, thus entailing a substantial loss of heat energy through the outgoing fumes.

As can be seen from U.S. Pat. No. 3,902,889 and from EP-B1-257.450 these nozzles or tuyeres on the bottom have an oxygen emission diameter between 3 and 6 mm. and consist advantageously of a double tube, with a central tube to emit $O_2$ and an annular surrounding slit to emit hydrocarbons and/or inert gases for cooling purposes.

The use of tuyeres to blow oxygen from the bottom, combined, for instance, with different fluids such as argon, nitrogen and methane, enables the oxidation reaction to be improved and made uniform.

The technology of tuyeres makes possible a better homogenization of the molten steel, thus permitting intensive working under a condition of a "long arc" without generating lack of uniformity of the temperature, and also permitting a reduction of the melting time and still other advantages.

In the state of the art the blowing from the bottom has always been carried out in practice with relatively high pressures and with relatively low rates of flow of gas through a plurality of tuyeres distributed on the bottom and generally having a small diameter.

This method entails a swift passage of the oxygen through the bath of molten metal, this oxygen being mostly burnt in the empty part of the furnace up to the roof of the furnace.

Moreover, the adjustment of the blowing during the various working cycles is carried out on the flow rate of the gases, and the pressure is variable as a fact resulting from the variation of the flow rate.

It should be noted that in the state of the art the tuyeres are placed substantially symmetrically on the hearth of the furnace, often in a position corresponding to that of the oxygen emission lances, which are located, moreover, in the high part of the furnace.

Such an arrangement of the tuyeres and of the lances delivering oxygen and other gases does not lead to great improvements in the efficiency and output of the melting plant since these gases become burnt in the empty part of the furnace and often finish burning in the fumes discharge conduit.

The state of the art detailed above is therefore not suitable to give an accurate idea of the true position of the techniques and technology of the state of the art, so that, in fact, at the present time there is still no electric arc furnace which uses on a great scale an alternative energy and which functions with appreciable results in an efficient and continuous manner.

The experiments of the state of the art have all ended with unsatisfactory results, so that in fact electric arc furnaces working industrially with assistance from an alternative energy do not now exist.

SUMMARY OF THE INVENTION

The present applicants have therefore tackled for some time now the task of perfecting a method and an electric furnace which, with the normal practice of a steelworks, provide a continuous production with an effective and efficient use of an alternative energy and with very short tap-to-tap times so as to make possible even up to 26/30 castings per day with an electric arc furnace.

The present applicants have therefore designed and tested for a long time and have thereafter obtained this invention so as to achieve high plant output, short melting times, modest consumption of energy and homogenization of the bath.

This invention employs in an innovatory manner the technology of the tuyeres and the blowing devices for the injection of gases and fuels into the furnace.

This injection of oxygen and fuels based on carbon has the purpose of causing a quick start-up of the exothermic chemical reactions of re-combination, by oxidation, of the chemical elements in the molten bath immediately above the bath and in the scrap during the progress of the melting.

According to the invention this injection of oxygen and fuels is carried out in such a way as to increase the surface area affected by the reaction so as to obtain a wide direct distribution of the heat, a considerable reduction of the consumption of electrical energy and a reduction of the times of melting of the charge.

The present applicants have found to their surprise that the best results are achieved when it is possible to obtain the reactions of re-combination of $CO+O=CO_2$ in the area between the surface of the bath of molten metal and the area immediately above the slag, so as to make use, on the one hand, of the effect of retaining and distributing the foamy conformation of the slag and, on the other hand, of the effect of direct transmission of the heat which the slag has in relation to the bath of molten metal.

The production cycle according to this invention can be applied to any type of charge even if, as an example, we shall dwell in this description substantially on three types of starting material to arrive at the molten steel.

The first type of example of a starting material provides for the use of scrap alone by charging the furnace with a plurality of charges, that is to say, by introducing the desired quantity of scrap into the furnace in a plurality of steps; in the cases considered hereinafter, the number of charges is typically two.

The second type of example of the starting material provides for a mixture of scrap and molten cast iron in desired percentages and advantageously with alternate charges, namely typically one charge of scrap, one charge of molten cast iron and a successive charge of scrap.

The third type of example of the starting material provides for a mixture of scrap and sponge-iron (pre-reduced iron) in desired percentages, advantageously with a first single charge of scrap together with a quantity of sponge-iron and a successive continuous charging of the remaining quantity of sponge-iron.

The invention provides for the injection into the furnace of:

an oxidizing gas from the bottom through oxygen tuyeres located in the hearth of the furnace, the gas being delivered at low pressures and with high flow rates;

oxygen and oxygen plus fuel (according to the working phases of the furnace) from above downwards by means of burners located on the sidewalls of the furnace in cooperation with the cooled panels included immediately above the layer of refractory material; this delivery takes place at an angle between 20° and 45° to the horizontal;

oxygen into the molten bath by means of supersonic lances working immediately above the surface of the molten metal and delivering the oxygen at an angle between 40° and 50°, but advantageously 45°, to the central axis of the furnace;

carbonaceous fuels on a gaseous carrier onto the layer of slag by means of lances delivering coal dust and positioned just above the surface of the slag and delivering this carbonaceous fuel from above downwards at an angle between 20° and 35°, but advantageously 30°, to the horizontal;

carbonaceous fuels on a gaseous carrier by means of tuyeres delivering coal dust and sending the fuels between the molten metal and the layer of slag.

The supersonic lances or the tuyeres delivering coal dust, or both, may be of a type with a fixed position or may be of a type which can be moved, actuated and positioned as desired either directly or by means of remote controls.

The invention tends to produce induced and controlled chemical reactions in a very specific zone of the furnace so as to make maximum use of the energy potential of the individual elements and, in particular, of the post-combustion phenomenon with a great effectiveness from the energy point of view towards the bath of molten metal.

In particular, the invention tends to induce and enhance a plurality of chemical reactions within the molten bath in the layer of slag and just above that layer of slag.

The oxygen injected from the bottom by the oxygen tuyeres rises from the bottom according to a wide cone of dispersion and reacts mostly with the Fe in the molten metal to create FeO, which re-combines with the C coming from the charge and present in the bath.

This re-combination frees the Fe and generates CO, which tends to rise above the molten metal into the slag.

The oxygen delivered by the supersonic lance and entering in depth into the bath reacts with the Fe to cause substantially the same reaction as that generated by oxygen from the oxygen tuyeres.

The supersonic lance sends the oxygen in the same direction as the direction of rotation of the molten bath, so that there take place a distribution of the heat produced and a honogenization over the whole surface of the bath.

The carbonaceous substances delivered by the tuyeres delivering the coal dust reduce the excess of FeO and generate CO, which contributes to the desired formation of foamy slag.

The lance delivering coal dust together with the supersonic oxygen lance causes a strongly reducing zone above the layer of slag, and owing to the rotation of the slag this reducing zone is distributed into an area heavily sprinkled with oxygen, thus contributing to the formation of further CO, which increases the foamy conformation of the slag.

The oxygen delivered by the burners involves the CO in the foamy slag and the CO emerging from that slag, thus generating a post-combustion reaction with a strong delivery of heat in close proximity to the foamy slag.

This foamy slag causes the transfer of the greater part of that heat to the molten metal.

This situation enables better advantages to be achieved in terms of transmission of heat to the molten bath and of uniformity of the resulting heat potential substantially over the whole surface of the bath.

According to the invention the blowing devices work substantially at the central zone of the furnace.

A first group of these blowing devices acts at a tangent to a ring defined by a first outer circumference, which has a maximum value of about 0.70 times the upper inner diameter of the furnace defined at the cooled panels, and by a second inner circumference, which has a minimum value of about 0.25 times the upper inner diameter of the furnace.

A second group of these blowing devices acts directly towards the center of the furnace.

This orientation of the blowing devices has the result of making uniform and homogeneous the transfer of thermal energy to the whole mass of molten metal without causing the problems of wear, which arise in the state of the art when the jets of the blowing devices work close to or against the refractory sidewalls of the furnace, against the electrodes and against the roof of the furnace, or when the post-combustion takes place in the free space of the furnace.

The melting method according to the invention can be divided substantially into at least two separate steps which characterize each single cycle of charging the material, plus a third step which takes place when the charge has been melted.

The first step corresponds to the charging of the furnace and to the start-up of the melting of the charge. This first step requires a great contribution of energy to start the melting of the charge, particularly when the charge is cold.

The first step is characterized by an accentuated use of the burners in their specific function, that is to say, in this first step the burners inject oxygen and a fuel, generally methane, to prime a reaction of combustion which generates a huge quantity of heat.

In this first step, according to the invention, at least one burner is employed in contributing to the speedy freeing from scrap of the zone in front of the supersonic lance and the lance delivering coal dust, the purpose of this being to free the space required for introduction of those lances into the furnace so that they can be quickly put to work.

Moreover, this burner affects a zone which would otherwise be a cold zone.

In this first step the oxygen tuyeres deliver oxidizing gas from the bottom at high rates of flow and at a low pressure. This pressure of the oxygen may be constant or continuously variable or variable in one or more steps.

In fact, it is desired to achieve the position that the oxygen injected from the bottom will expand over a wide zone and will be displaced slowly into the molten metal so as to achieve the best and most complete combination with the iron molecules.

In this first step the emission of the oxygen by the supersonic lances takes place not at once but when a minimum head of molten metal is present and the whole relative zone is free of scrap.

The second step concerns the completion of the melting of the charge.

In this second step the feed of fuel to the burners is interrupted and the burners are caused to function substantially as subsonic oxygen lances operating as far as possible in the vicinity of the surface of the foamy slag.

In this second step there is an intense use of the supersonic lances and of the means blowing the coal dust so as to intensify the chemical reactions detailed above.

According to the invention the pressure of blowing the oxygen from the oxygen tuyeres may be constant or may be increased progressively (as said above, continuously or according to one or more steps) so as to supply also a greater quantity of oxygen according to the requirements of the bath.

However, this blowing pressure always remains within about limited values and never exceeds a value of 8 to 10 bar at the inlet of the oxygen tuyere.

The rate of flow of the oxygen in the oxygen tuyeres, at least in the first and second melting steps, may vary between a minimum value of about 2.8 $Nm^3$/min. per each single oxygen tuyere and a maximum value of about 6.0 $Nm^3$/min.

The low blowing pressure at which the oxygen is delivered does not create problems of spurting of the molten steel and, above all, does not create problems of the thermal lance type with a resulting perforation of the roof.

Moreover, the great quantity of oxygen and the low blowing pressure lead to the creation of a wide zone of diffusion and a strong re-mixing in the molten metal.

The exothermic reactions arising therefrom transfer a substantial quantity of heat directly into the mass of molten metal and in a huge area thereof.

The positioning and orientation of the subsonic oxygen lances are such as to ensure a wide effect of covering the surface of the slag, bearing in mind also the convective motions of the molten bath and of the slag on a substantially horizontal plane.

It should be noted that the low blowing pressure from the bottom causes also less turbulence in the bath and therefore less problems for the electric arc, thereby improving the yield of the same.

The third step in the method is the refining step.

In this third step the burners, either acting as such or as subsonic oxygen lances, are normally disactivated since the yield of the burners becomes negligible.

Lastly, there is the tapping of the molten metal; in this step, if working is carried out with a liquid heel, a desired and determined quantity of molten metal is kept within the furnace.

Where there is a liquid heel, the tuyeres on the bottom are kept working with a minimum blowing pressure of about 3 to 4 bar and with a minimum flow rate of 1.5 to 1.8 $Nm^3$/min., with possibly only inert gases being blown in.

This minimum pressure is the pressure enough to overcome the ferrostatic pressure of the liquid heel and to withstand the dynamic action which the charge exerts on the molten metal at the moment of its introduction.

This minimum value is therefore calculated so that there will be no flow-back of molten metal into the tuyeres, for a flow-back would lead to blockage thereof.

BRIEF DESCRIPTION OF THE DRAWINGS

The attached figures are given as a non-restrictive example and show a preferred embodiment of the invention as follows.

DETAILED DESCRIPTION OF THE PREFERRED EMBODIMENTS

Figure 2:
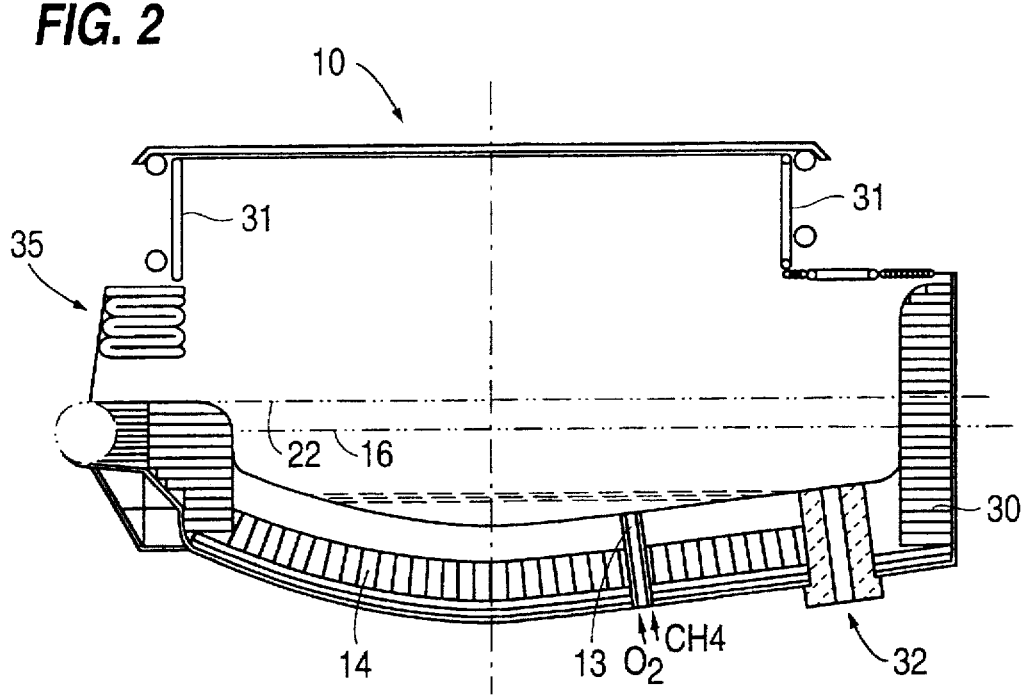
FIG. 2 is a diagram of a longitudinal section of the electric arc furnace of FIG. 1.

An electric arc furnace 10 shown in FIGS. 1 to 5 comprises in this case three upper electrodes 11a, 11b and 11c respectively for generation of the electric arc.

The description which follows therefore concerns an electric arc furnace working with alternating current and with a liquid heel, but remains valid also in the event of an electric arc furnace working with direct current or a furnace without a liquid heel.

The electric arc furnace 10 is equipped with oxygen tuyeres 13, four in number in this case and positioned in the hearth 14.

According to the invention the oxygen tuyeres 13 are positioned within a ring which surrounds a circle 34 enclosing the electrodes 11a, 11b, 11c and is outside that circle 34.

The ring, which, depending on the structure of the hearth 14 of the furnace 10, may be circular or may have another similar configuration, is defined by an outer perimeter and an inner perimeter.

The outer perimeter is defined by a diameter which is advantageously about 0.5 to 0.7 times the upper inner diameter defined in the high part of the furnace 10 which includes the cooled panels 31, whereas the inner perimeter is defined by a diameter which is advantageously about 0.25 to 0.35 times that upper inner diameter.

According to the invention the vertical axis of the oxygen tuyere 13 in relation to the closest vertical refractory sidewall 30 has to be distant from that sidewall 30 by a value between at least 0.7 and 1.4 times the height of the liquid head at the specific oxygen tuyere 13.

Figure 1:
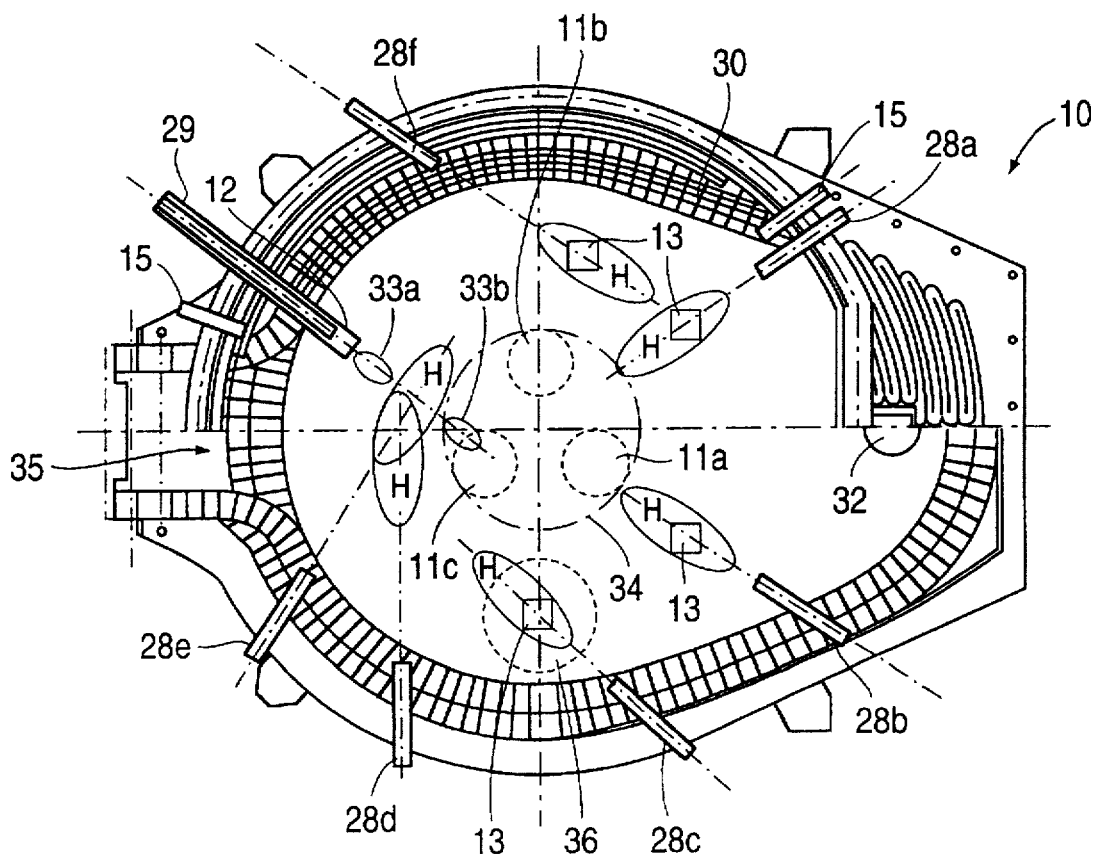
FIG. 1 shows a partial plan view of a section of the electric arc furnace according to the invention.
Figure 3:
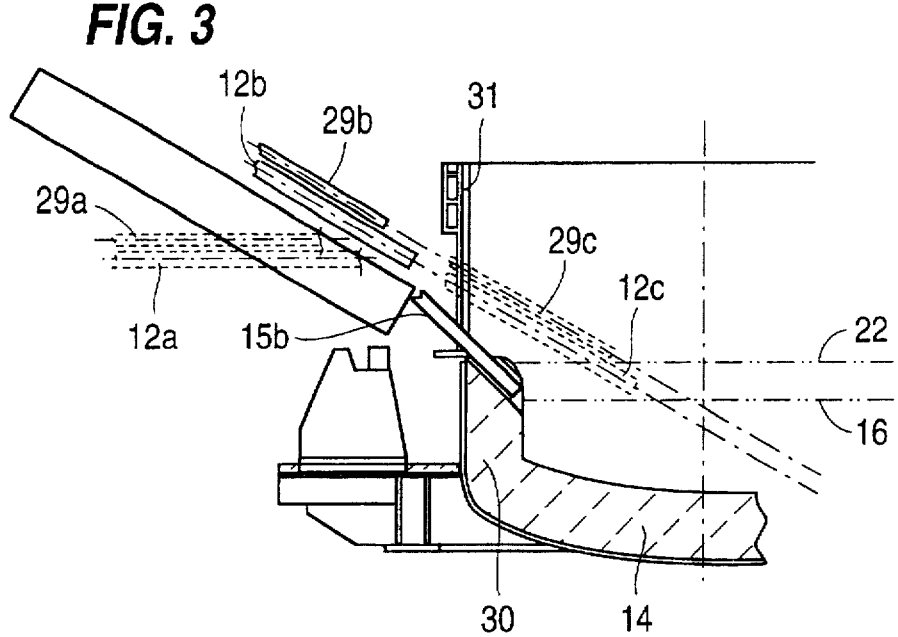
FIG. 3 is a partial view of a longitudinal section of the electric arc furnace.

In the example shown in FIG. 1, the oxygen tuyeres 13 are arranged substantially along a circumference equal to about 0.55 times the upper inner diameter and are located in the front semi-circle of the hearth 14 toward the tap hole 32.

This semi-circle is defined by the vertical plane positioned perpendicular to the longitudinal vertical plane which passes through the tap hole 32 and through the central axis of the furnace 10.

Figure 9:
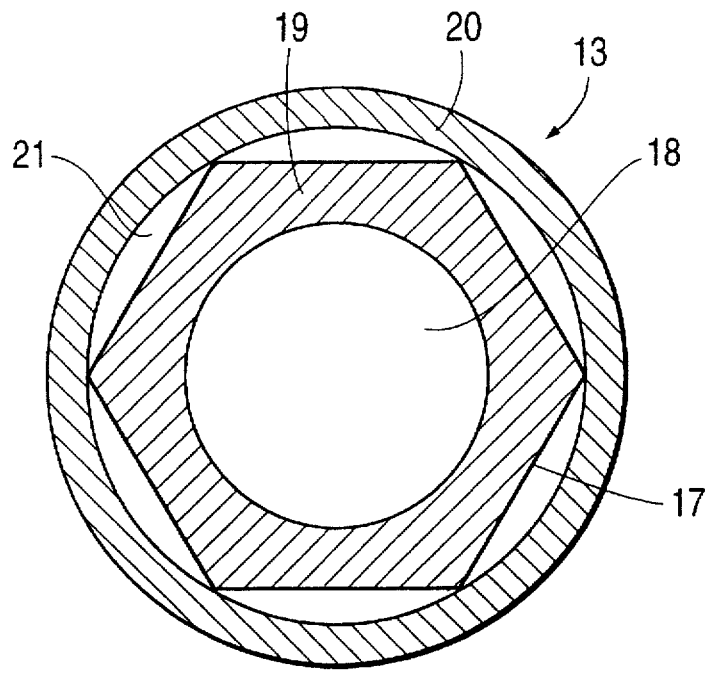
FIG. 9 shows a cross-section of a possible form of embodiment of the oxygen tuyere according to the invention.

At least one oxygen tuyere 13 is included in a position of substantial cooperation with a hole 36 for the aspiration of fumes located in the roof of the furnace 10 and shown with lines of dashes in FIG. 1;

According to the invention (FIG. 9) the oxygen tuyeres 13 include a central pipe 18 to deliver oxygen, this pipe being provided by means of a bore in a polygonal copper section 19.

This polygonal copper section 19 is surrounded by a cylindrical pipe 20 so as to create a plurality of sectors 21 between each side 17 of the polygonal copper section 19 and the inner circumference of the cylindrical pipe 20.

The sectors 21 form passages for the gaseous cooling mixture.

The central pipe 18 to deliver oxygen advantageously has a diameter between 10 and 20 mm., but preferably between 10 and 14 mm.

The cooling mixture passing through the sectors 21 consists of at least one gas of a high cooling power, methane in this case, and of a diluting or filling gas, $CO_2$ in this case, or else $N_2$ or a mixture of these gases.

Hereinafter only $CO_2$ is indicated as the diluting gas but the conditions of $CO_2$, $N_2$ gases or a mixture shall be understood as being included.

Figure 10:
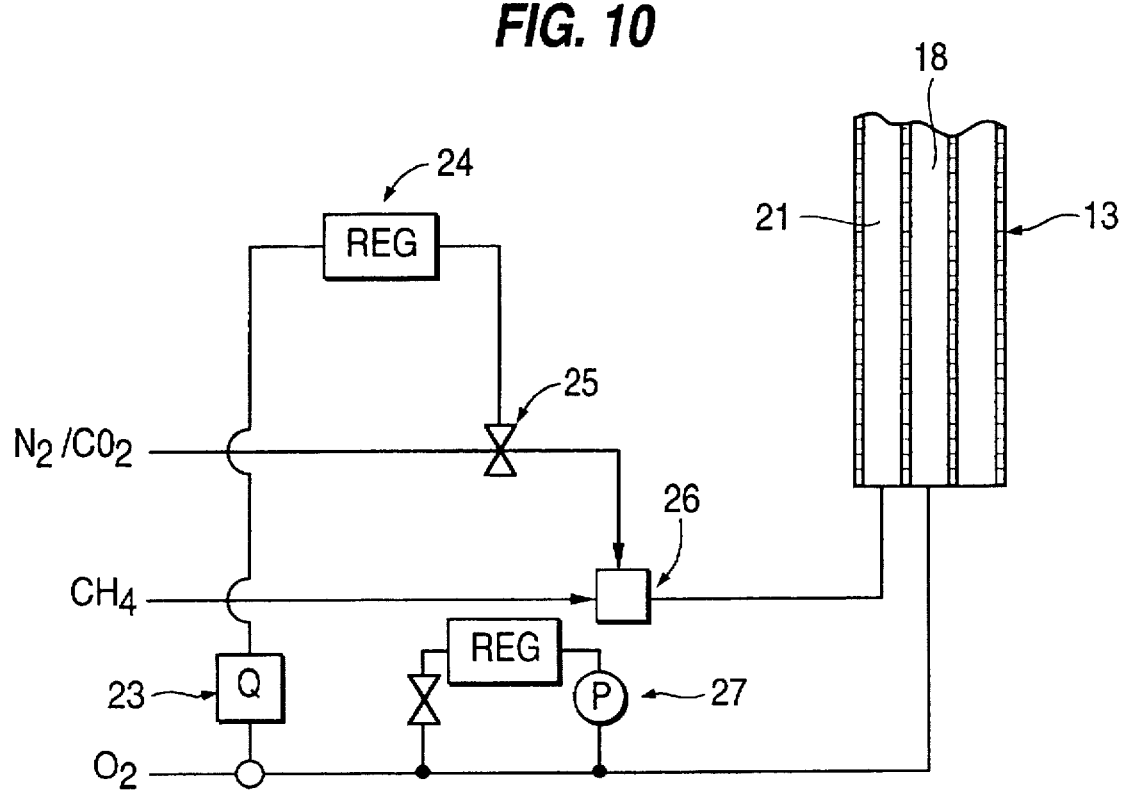
FIG. 10 is a diagram of the system of feeding the oxygen tuyeres according to the invention.

FIG. 10 shows with a block diagram the system for immediate adjustment of the percentages of these components of the cooling mixture.

The adjustment of the percentages is carried out so as to keep unchanged, or substantially unchanged, the ratio between the quantity of cooling gas in the mixture and the flow rate of the oxygen, with a value determined beforehand as being indispensable for ensuring the necessary and desired cooling of the oxygen tuyeres 13.

In this case the primary adjustment takes place, by means of an adjustment circuit 27, on the pressure of the oxygen injected through the central delivery pipe 18 of the oxygen tuyeres 13.

This adjustment of pressure affects the flow rate of the oxygen, this flow rate being read continuously by a flow rate reader 23 and being sent to an adjuster 24.

This adjuster 24 acts on a valve 25 located on the feed line of $CO_2$ so as to vary the pressure of the same.

Variation of the pressure of the $CO_2$ causes a corresponding variation of the rate of flow of the $CO_2$, this variation of the rate of flow being compensated in a mixer 26 by a variation of the $CH_4$.

According to the invention the minimum rate of flow of oxidizing gas in the melting steps in each of the oxygen tuyeres 13 is about 2.8 $Nm^3$/min., whereas the maximum rate of flow may reach about 6.0 $Nm^3$/min..

In the tapping step, or in the periods of awaiting a charge, particularly when there is a liquid heel in the furnace 10, the blowing pressure is kept at about 3 to 4 bar, with minimum rates of flow of about 1.5 to 1.8 $Nm^3$/min..

The blowing pressure, according to the conformation of the furnace 10, may be the same in all the oxygen tuyeres 13 or may be a characteristic pressure for each oxygen tuyere 13 according to the relative position thereof.

This pressure is never greater than 10 bar, as measured at the inlet of the oxygen tuyeres 13, for a height of the bath of molten metal from 0.7 to 1.1 meters on the vertical plane of the oxygen tuyere 13.

A supersonic lance 12 combined with a coal dust lance 29 is included to blow the oxygen within the molten bath 16 and thereabove.

The supersonic lance 12 and the coal dust lance 29 work in the area in front of the door 35 of the furnace 10; these lances 12 and 29 work, moreover, at a tangent to a circumference within the circle 34 containing the electrodes 11 and work in the same direction as the direction of rotation of the bath 16 of molten metal and of the slag 22.

In this case (FIG. 3), the supersonic lance 12 and the coal dust lance 29 have respective first inactive positions 12a, 29a outside the furnace 10, second respective waiting positions 12b, 29b outside the furnace 10 and respective third working positions 12c, 29c within the furnace 10.

In their third working positions 12c, 29c the supersonic lance 12 and coal dust lance 29 are inclined towards the bath 16 of molten metal by an angle of about 30° to the horizontal; the supersonic lance 12 has its outlet in close proximity to the surface of the bath 16 of molten metal, whereas the coal dust lance 29 has its outlet in close proximity to the surface of the layer of slag 22.

The supersonic lance 12 delivers the oxygen onto the bath 16 of molten metal at an angle (measured on the horizontal plane) between 40° and 50°, but advantageously 45°, to the central axis of the furnace 10.

The supersonic lance 12 injects the oxygen into the bath 16 of molten metal through one single outlet hole with a very carefully oriented jet, thus defining an area 33a on the surface of the bath 16 of molten metal; the part of the oxygen injected by the supersonic lance 12 which does not combine with the Fe emerges in an area 33b located generally within the circle 34 surrounding the electrodes 11.

The supersonic lance 12 is oriented so as to work in the bath 16 of molten metal in an area not equipped with oxygen tuyeres 13.

Tuyeres 15 to deliver coal dust, which in this case are two in number (FIG. 1), are included in cooperation with the refractory sidewalls 30 substantially at the level of the layer of slag 22.

These coal dust tuyeres 15 consist advantageously of replaceable ceramic-coated pipes, are generally installed immovably and have the function of delivering the carbonaceous substances onto the molten bath 16 below the layer of slag 22.

Figure 4:
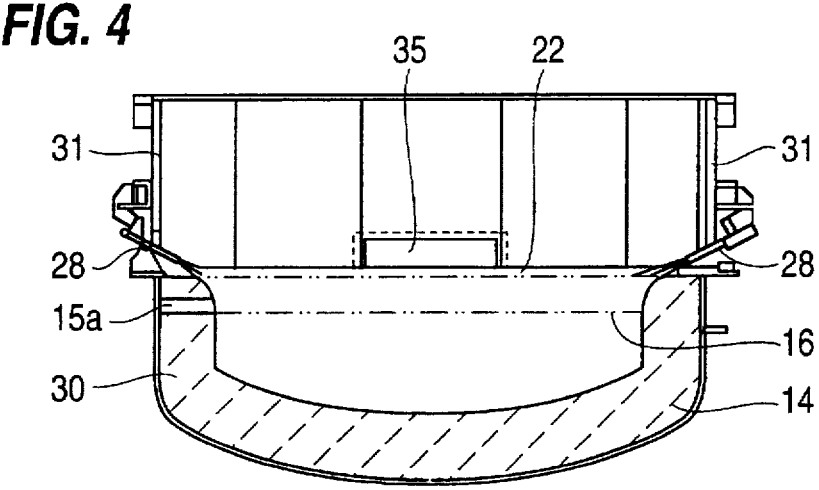
FIG. 4 shows another longitudinal section of the electric arc furnace.
Figure 5:
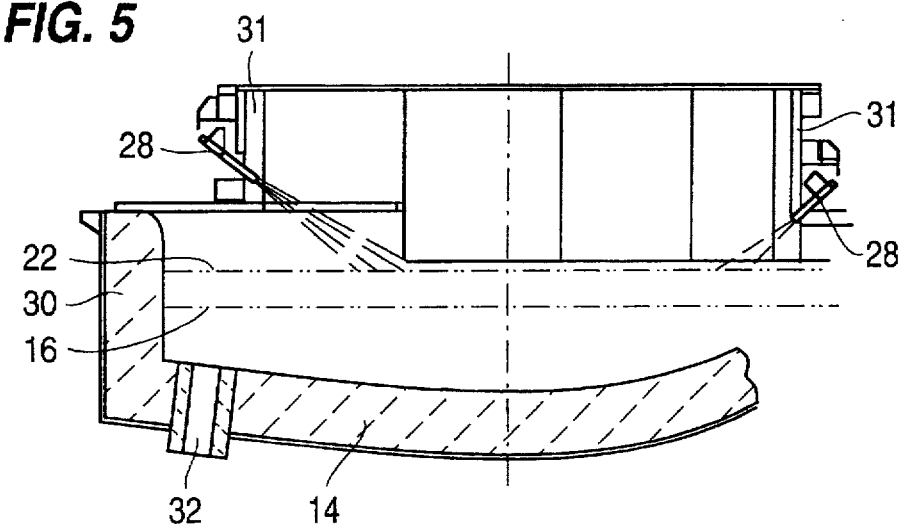
FIG. 5 shows a further longitudinal section of the electric arc furnace.

These coal dust tuyeres 15 face towards the center of the furnace 10 and are fitted in a substantially horizontal position (15a, FIG. 4).

According to a variant, the coal dust tuyeres 15 (15b, FIG. 3) are inclined downwards by an angle between about 30° and 45° to the horizontal.

One of these coal dust tuyeres 15 cooperates with the supersonic lance 12 in delivering carbonaceous substances below the slag 22.

The other coal dust tuyere 15 cooperates with a zone located at the side of the tap hole 32 in an area heavily sprinkled with the oxygen arriving from the oxygen tuyeres 13.

Burners 28 are installed, according to the invention, on the cooled sidewalls 31 of the furnace 10 and act downwards from above and are inclined to the horizontal by an angle between 20° and 45°.

According to the invention the burners 28 emit oxygen at a subsonic speed.

In this case, there are six burners 28, of which two burners 28a, 28b are oriented towards the center of the furnace 10 so as to cooperate, in the first melting step, with the electrodes 11 and, in the second melting step, with the carbonaceous substances delivered by the coal dust tuyeres 15 and with the oxygen delivered by the oxygen tuyeres 13.

Next, there is at least one burner, the burner 28e in this case, which collaborates also in freeing the path of the supersonic lance 12 so that the latter can be quickly put in its working position 12c.

This burner 28e has also the task of delivering and making uniform the heat on the scrap in the zone in front of the door 35 of the furnace 10, for this zone would otherwise be cold.

The other burners 28c, 28d, 28f are arranged according to a configuration whereby the action of one burner works as a support for the action of the next one and the burners direct their jets in a direction substantially at a tangent to a plurality of circumferences.

Two of these burners 28f, 28c work in surface zones which are positioned on the vertical plane of the oxygen tuyeres 13, whereas the other burners 28d and, partly, 28e, have the purpose of conveying the heat and combining it so as to complete the action of one burner working as a support for the action of the next one.

According to the invention the circumferences along which the burners 28 work are outside the circle 34 of the electrodes 11 and have a diameter substantially between 0.25 and 0.70 times the upper inner diameter of the electric arc furnace 10 so as to affect a ring which coincides substantially with the ring of positioning of the oxygen tuyeres 13.

In a first embodiment of the invention, the burners 28c–28f act in a direction the same as the normal direction of rotation of the bath 16 of molten metal and of the layer of slag 22 during the melting process.

According to a variant, as can be seen in FIG. 1 where the burners 28 work in the direction contrary to the working of the supersonic oxygen lance 12 and of the coal dust lance 29, the burners 28c–28f act in the opposite direction to the direction of rotation of the molten bath 16 and of the layer of slag 22.

The burners 28 have an outlet equipped with a number of holes from six to ten for delivery of oxygen.

In this way the oxygen jet emitted expands to create a huge affected lateral zone, referenced with "H" in FIG. 1, which broadens the field affected by the oxidization reactions and improves the energy contribution.

Figure 6:
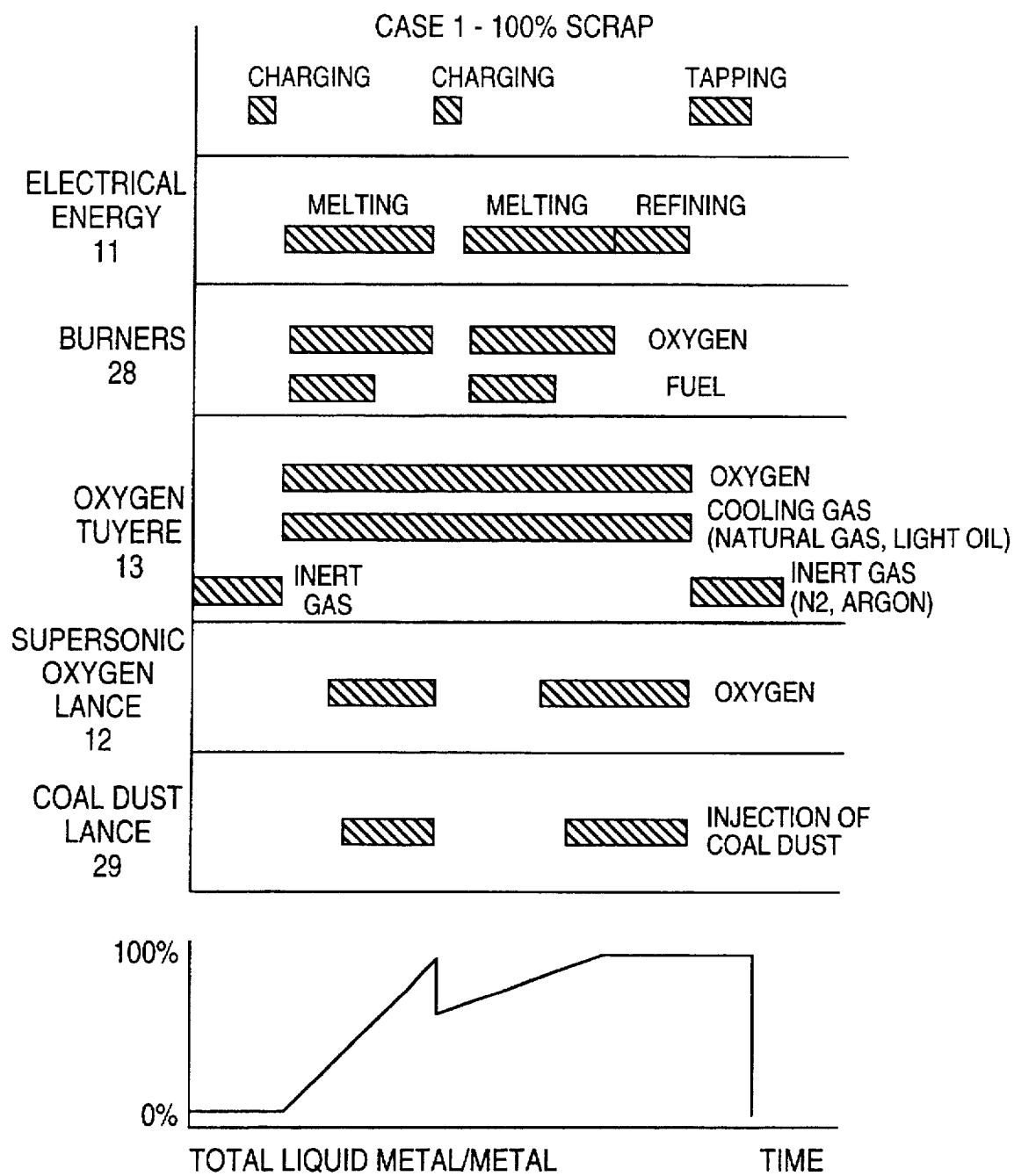
FIGS. 6, 7 and 8 show three possible different melting cycles of the electric arc furnace according to the invention.
Figure 7:
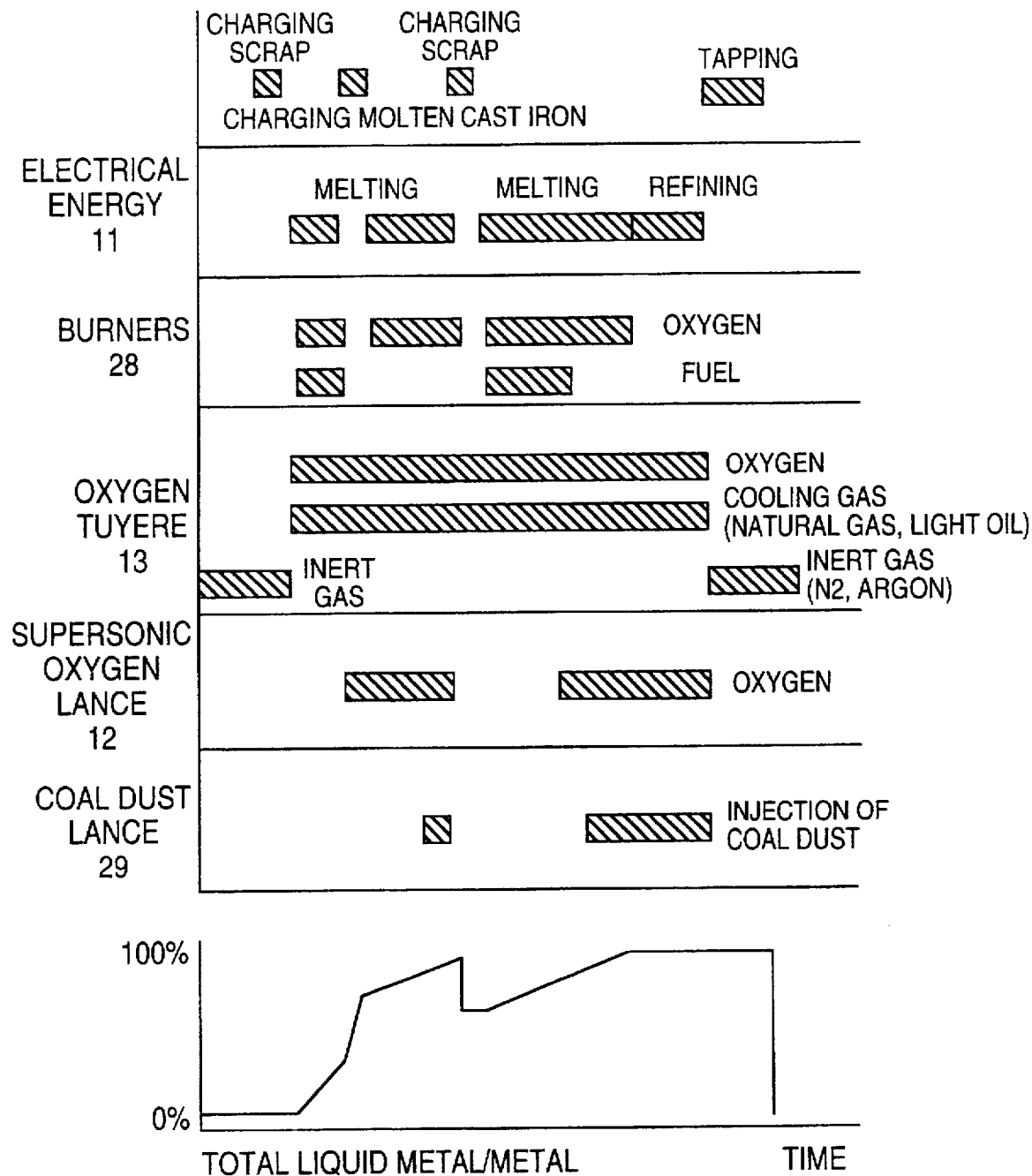
Figure 8:
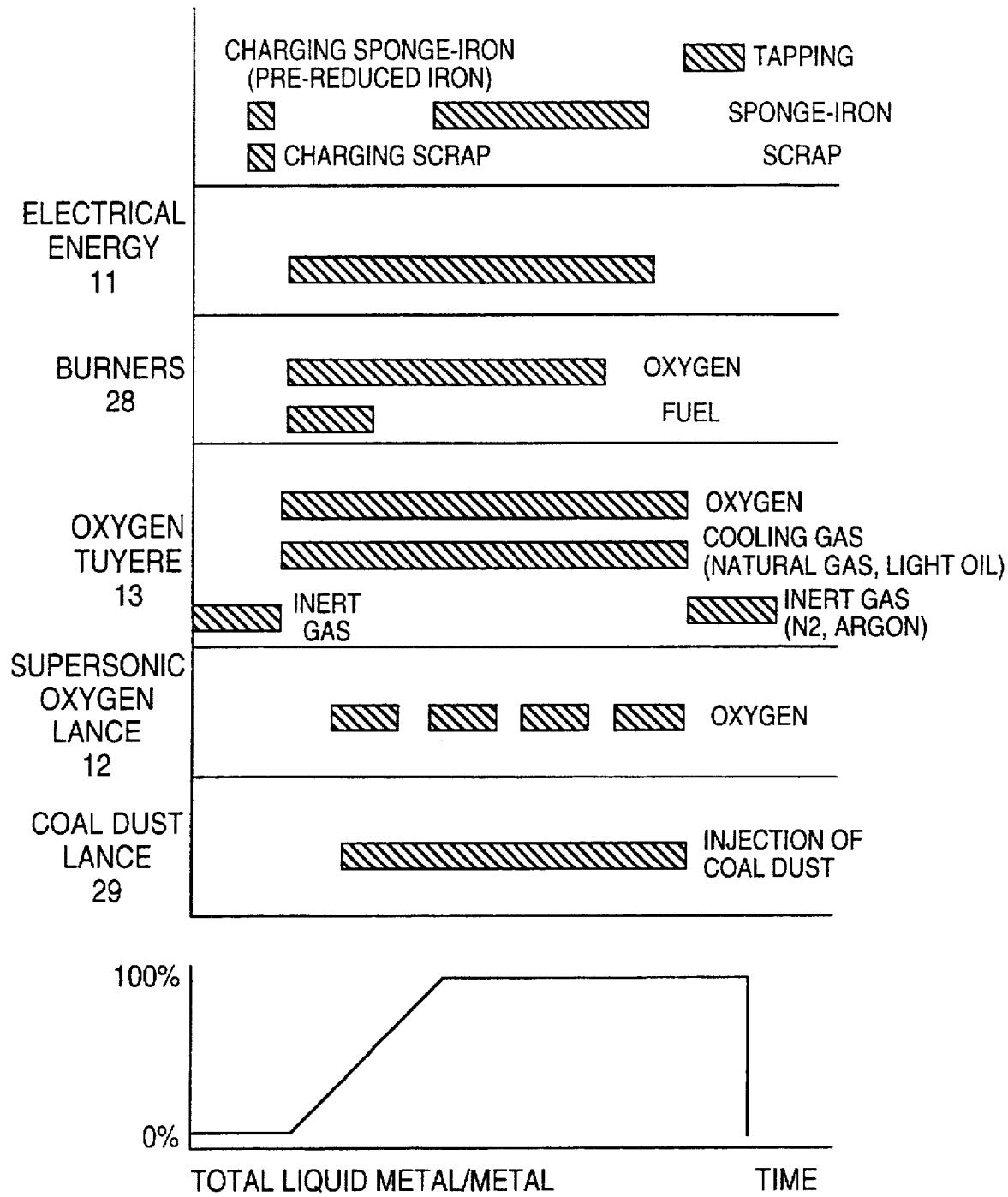

The methods of working of the burners 28, the supersonic lance 12, the coal dust lance 29, the coal dust tuyeres 15, the oxygen tuyeres 13 and the electrodes 11 are shown in FIGS. 6, 7 and 8 for three possible examples of application.

In particular, FIG. 6 shows the case of application of charging of the furnace with only scrap in two separate charges; FIG. 7 shows the case of charging with scrap and molten cast iron with a first charge of scrap, a charge of molten cast iron and a second charge of scrap, whereas FIG. 8 shows the case of charging with scrap and sponge iron with a first mixed charge of scrap/sponge iron and a second charge with sponge iron only.

The first two cases show also a precise step of refining, which follows the step of melting of the metal, whereas in the third case the refining step is continuous.

These illustrative diagrams show that the invention arranges, for each cycle of melting of the single charge, to make the burners 28 work, upon start-up of the melting, in their specific function by means of a combined emission of oxygen and fuel.

In the second step of melting, or advanced melting, the percentage of molten metal as compared to the total of metal within the electric arc furnace 10 has reached a significant value, and this situation entails a reduction of the transfer of heat from the burners 28 to the scrap and molten metal and therefore an appreciable reduction of the efficiency of the burners 28.

In this second step the feed of the fuel is interrupted and the burners 28 are caused to function substantially as subsonic oxygen lances.

From the diagrams, which refer to cases of working of the electric arc furnace 10 with a molten heel, it is also possible to see how the oxygen tuyeres 13 always maintain a minimum blowing pressure even during the periods of pauses between one charge and the next charge.

Moreover, it is possible to see how the supersonic lance 12 and the coal dust lance 29 are activated only in a stage of advanced melting, in this case too when the percentage of molten metal as compared to the total of the metal has reached a value corresponding to the presence of a minimum liquid heel.

We claim:

1. Melting method for an electric arc furnace with alternative sources of energy for melting of iron-based alloys, the electric furnace including oxygen tuyeres positioned on the bottom to deliver oxygen, at least one coal dust tuyere to deliver carbonaceous substances in about the area of contact between the bath of molten metal and the layer of slag, at least one supersonic oxygen lance for delivering oxygen and cooperating with a coal dust lance for delivering carbonaceous substances and positioned at the side of or above the supersonic lance, the supersonic oxygen lance and the coal dust lance having at least one waiting position outside the furnace, a working position in which the supersonic lance is positioned in close proximity to the surface of the layer of slag, and a path of introduction between the at least one waiting position and the working position, a plurality of burners positioned on cooled sidewalls of the furnace in the vicinity of the upper edge of underlying refractory material of the furnace and downwardly oriented for delivering oxygen-based gases and combustible substances, whereby action of one burner of at least two first burners supports action of the next one, the furnace being charged with one or more charges, a refining step and a tapping step being conducted after melting of the last charge, which method comprises:

a first step of start-up melting of each charge, a second step of melting each charge, in the first step of start-up of the melting, operating at least one second burner for freeing quickly the path of introduction of the supersonic lance and of the coal dust lance into the furnace so as to bring these lances quickly to their working positions, directing at least one third burner towards the center of the furnace in cooperation with at least part of an area at which oxygen delivered by an oxygen tuyere emerges to the surface of the bath, using the plurality of burners in the first step as burners and in the second step as subsonic oxygen lances and in a third step are substantially shut off, delivering carbonaceous substances into the furnace and directing delivery of the carbonaceous substances towards the center of the furnace so as to take action in cooperation with the slab both above the slag and between the slag and the molten metal, causing the reactions Fe+O=FeO, FeO+C=Fe+Co to take place within the bath of molten metal just above the surface of the molten metal and at about a thickness of the slag, which is processed to become foamy slag, and causing the reaction CO+O=$CO_2$ to take place just above the surface of the molten metal and at about the thickness of the slab so as to carry out the post-combustion process with a maximum transfer of heat to the metal within the furnace.

2. Melting method as in claim 1, whereby at least in the first and second steps each oxygen tuyere delivers a minimum rate of flow of oxygen of about 2.8 $Nm^3$/min., while the pressure measured at the inlet of the oxygen tuyere having a delivery hold with a diameter measuring between 10 and 20 mm. and being positioned at a minimum distance between 0.7 and 1.4 times a height of a liquid head of molten metal from a refractory sidewall of the furnace.

3. Melting method as in claim 1, whereby the supersonic lance (29) and the coal dust lance (29) work downwards at an angle between 20° and 35° to the horizontal and operate in the area in front of the door of the electric arc furnace, at least one supersonic lance and one coal dust lance working in the same direction as the direction of rotation of the molten metal and at a tangent to a circumference inside the circle which encloses the electrodes of the furnace.

4. Melting method as in claim 3, whereby the oxygen from the supersonic lance is delivered into the molten metal at an angle between 40° and 50° to the central axis of the furnace.

5. Melting method as in claim 1, whereby in the event of working with a liquid heel the oxygen tuyeres have in each step a minimum blowing pressure depending on the value of the ferrostatic pressure of the liquid heel and on the dynamic action of the charge on the bath of molten metal at the moment of introduction of the charge into the furnace, this minimum pressure at the tuyere being at least 3 bar with a minimum rate of flow of at least 1.5 $Nm^3$/min.

6. Melting method as in any claim 1, whereby the rate of flow of a cooling mixture in each single oxygen tuyere is adjusted according to the rate of flow of the oxidizing gas delivered through the same oxygen tuyere.

7. Melting method as in claim 1, whereby the delivery of the oxygen by the oxygen tuyeres takes place substantially in the front half of the furnace towards a tap hole (32), and the pressure of delivery is the same in all the oxygen tuyeres.

8. Melting method as in claim 1, whereby the delivery of the oxygen by the oxygen tuyeres takes place substantially in the front half of the furnace in which a tap hole is present, and the pressure of delivery is characteristic for at least some of the oxygen tuyeres.

9. Melting method as in claim 1, whereby at least one coal dust tuyere (15) delivers coal dust in a zone cooperating with the area of introduction of oxygen by the supersonic lance.

10. Melting method as in claim 1, whereby at least one coal dust tuyere (15) delivers coal dust in a zone cooperating with a tap hole and in the vicinity of the zone of operation of at least one third burner carefully oriented towards the center of the furnace.

11. Melting method as in claim 1, whereby at least one coal dust tuyere (15) delivers coal dust in a zone cooperating with tuyere tap hole and in the vicinity of the area above an oxygen tuyere.

12. Melting method as in claim 1, whereby the first burners work with the action of one burner working as a support for the action of the next one and act within a substantially circular ring defined by an inner diameter of about 0.25 times the upper inner diameter of the furnace and by an outer diameter of about 0.70 times the upper inner diameter of the furnace.

13. Electric arc furnace with alternative sources of energy for melting of iron-based alloys, comprising oxygen tuyeres positioned on the bottom to deliver oxygen, at least one coal dust tuyere to deliver carbonaceous substances in about the area of contact between the bath of molten metal and the layer of slag, at least one supersonic oxygen lance for delivering oxygen and cooperating with a coal dust lance for delivering carbonaceous substances and positioned at the side of or above the supersonic lance, the supersonic oxygen lance and the coal dust lance having at least one waiting position, outside the furnace and a working position, in which the supersonic lance is positioned in close proximity to the surface of the bath of molten metal and the coal dust lance is positioned in the vicinity of the surface of the layer of slag, a plurality of burners positioned on cooled sidewalls of the furnace in the vicinity of the upper edge of underlying refractory material of the furnace and downwardly oriented for delivering oxygen-based gases and combustible substances, whereby action at one burner of at least two first burners supports action of one burner working as a support for the action of the next one, wherein at least one second burner is oriented to operate in the zone in front of the supersonic lance, and at least one third burner is oriented towards the center of the furnace, an operating area ("H") of the third burner cooperating with the operating area of at least one oxygen tuyere, the plurality of burners having a first working condition, in which they deliver oxygen together with combustible material, and a second working condition, in which they delivery only oxygen and perform the task of subsonic oxygen lances, the oxygen tuyeres including delivery hole with a diameter of at least 10 mm., at least three of the oxygen tuyeres being included in a front semicircle of the furnace.

14. Electric arc furnace as in claim 13, in which the oxygen tuyeres are located in a circular ring defined by an outer perimeter having a diameter of 0.70 times the upper inner diameter of the furnace and by an inner perimeter having a diameter of 0.25 times the upper inner diameter of the furnace (10), these oxygen tuyeres being located at a minimum distance equal to between 0.7 and 1.4 times a head of molten metal from a refractory sidewall of the furnace.

15. Electric arc furnace as in claim 13, in which the oxygen tuyeres are located in a circumference defined by a diameter of about 0.55 times the upper inner diameter of the furnace.

16. Electric arc furnace as in claim 13, in which each oxygen tuyere consists of a hollow copper polygonal section defining a central pipe providing a passage for oxygen and having a diameter of between 10 and 20 mm., and of a cylindrical pipe surrounding the polygonal section, the cylindrical pipe defining between its inner surface and the outer surfaces of the polygonal section a plurality of passages for cooling mixture.

17. Electric arc furnace as in claim 13, in which at least one supersonic lance and the coal dust lance positioned at the side or above the at least one supersonic lance are oriented in the same direction as the rotation of the molten metal and lie at a tangent to a circle inside the circle enclosing electrodes of the furnace and face downwards, oxygen from the at least one supersonic lance being delivered into the molten metal at an angle between 40° and 50° to the horizontal.

18. Electric arc furnace as in claim 13, which the at least one coal dust tuyere is installed horizontally in cooperation with the refractory sidewalls and has an outlet positioned below the level of the surface of the layer of slag.

19. Electric arc furnace as in claim 13, in which the at least one coal dust tuyere is oriented downwards at an angle between 30° and 45° to the horizontal and has an outlet located below the level of the surface of the layer of slab.

20. Electric arc furnace as in claim 13, in which the at least one coal dust tuyere comprises replaceable ceramic-coated pipes.

21. Electric arc furnace as in claim 13, in which the plurality burner are fitted to the cooled sidewalls of the furnace, are inclined downwards by an angle between 20° and 45° to the horizontal and have a number of outlets between six and ten.

* * * * *